United States Patent
Marupaduga

(10) Patent No.: US 12,324,037 B1
(45) Date of Patent: Jun. 3, 2025

(54) ENSURING QUALITY OF SERVICE FOR RELAY NODES

(71) Applicant: Sprint Spectrum LP, Overland Park, KS (US)

(72) Inventor: Sreekar Marupaduga, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 722 days.

(21) Appl. No.: 17/089,310

(22) Filed: Nov. 4, 2020

(51) Int. Cl.
| | |
|---|---|
| *H04W 76/15* | (2018.01) |
| *H04B 17/336* | (2015.01) |
| *H04W 16/14* | (2009.01) |
| *H04W 24/08* | (2009.01) |
| *H04W 60/06* | (2009.01) |
| *H04W 72/0453* | (2023.01) |
| *H04W 72/541* | (2023.01) |
| *H04W 88/10* | (2009.01) |

(52) U.S. Cl.
CPC .......... *H04W 76/15* (2018.02); *H04B 17/336* (2015.01); *H04W 16/14* (2013.01); *H04W 24/08* (2013.01); *H04W 60/06* (2013.01); *H04W 72/0453* (2013.01); *H04W 72/541* (2023.01); *H04W 88/10* (2013.01)

(58) Field of Classification Search
CPC ... H04W 24/08; H04W 88/10; H04W 72/082; H04W 60/06; H04W 16/14; H04W 16/0453; H04W 72/0453; H04B 17/336
See application file for complete search history.

(56) References Cited

U.S. PATENT DOCUMENTS

| | | | |
|---|---|---|---|
| 5,239,675 A * | 8/1993 | Dudczak | H04B 1/1027 455/222 |
| 9,253,786 B2 * | 2/2016 | Kazmi | H04W 72/082 |
| 9,473,286 B1 * | 10/2016 | Shipley | H04L 5/001 |
| 10,327,267 B1 * | 6/2019 | Malhotra | H04L 65/80 |
| 10,455,464 B1 * | 10/2019 | Oroskar | H04L 5/1438 |
| 10,555,357 B1 * | 2/2020 | Sharma | H04L 45/16 |
| 10,616,801 B1 * | 4/2020 | Pawar | H04W 28/065 |
| 10,715,088 B1 * | 7/2020 | Ghanevati | H03F 1/26 |
| 10,735,111 B2 * | 8/2020 | Harel | H04B 17/0085 |
| 10,805,876 B1 * | 10/2020 | Parihar | H04W 60/00 |
| 10,827,423 B1 * | 11/2020 | Manganiello | H04W 48/20 |
| 10,979,986 B1 * | 4/2021 | Brisebois | H04W 52/343 |
| 10,999,748 B1 * | 5/2021 | Chandra | H04W 72/0453 |
| 11,026,131 B1 * | 6/2021 | Marupaduga | H04W 36/22 |
| 11,039,367 B1 * | 6/2021 | Vivanco | H04W 76/15 |
| 11,064,425 B1 * | 7/2021 | Cui | H04W 48/18 |
| 11,109,271 B1 * | 8/2021 | Oroskar | H04L 5/0098 |
| 11,356,139 B2 * | 6/2022 | Zhou | H04B 1/525 |

(Continued)

FOREIGN PATENT DOCUMENTS

KR 20110036943 * 4/2011 ...... H04W 36/00837

*Primary Examiner* — Hassan A Phillips
*Assistant Examiner* — Prenell P Jones
(74) *Attorney, Agent, or Firm* — Jones Robb, PLLC

(57) ABSTRACT

5G relay nodes attached to millimeter wave carriers (whether standalone or EN-DC) may suffer from poor quality of service due to intermodulation distortion at the donor access node. The relay node is instructed to attach to a lower-frequency carrier, or a different donor access node. The lower-frequency carrier can include another 5G carrier deployed by the same donor access node, or a 4G carrier or any other carrier.

20 Claims, 9 Drawing Sheets

(56) References Cited

U.S. PATENT DOCUMENTS

| | | | | |
|---|---|---|---|---|
| 11,490,301 | B1* | 11/2022 | Marupaduga | H04W 36/14 |
| 2007/0077890 | A1* | 4/2007 | Drabeck | H04B 17/27 |
| | | | | 455/67.11 |
| 2013/0165819 | A1* | 6/2013 | Tieu | A61N 1/37252 |
| | | | | 600/595 |
| 2013/0322395 | A1* | 12/2013 | Kazmi | H04W 72/541 |
| | | | | 370/328 |
| 2015/0056921 | A1* | 2/2015 | Schwartz | G16H 40/67 |
| | | | | 455/41.2 |
| 2015/0214904 | A1* | 7/2015 | Lozhkin | H03F 3/245 |
| | | | | 330/75 |
| 2015/0351044 | A1* | 12/2015 | Boudreau | H04W 52/243 |
| | | | | 370/329 |
| 2016/0241277 | A1* | 8/2016 | Rexberg | H03F 3/24 |
| 2016/0285538 | A1* | 9/2016 | Han | H04B 7/15535 |
| 2016/0302209 | A1* | 10/2016 | Behravan | H04W 72/541 |
| 2016/0366605 | A1* | 12/2016 | Tsui | H04W 24/08 |
| 2017/0208495 | A1* | 7/2017 | Kleinbeck | H04W 24/08 |
| 2017/0290075 | A1* | 10/2017 | Carbajal | H04L 27/00 |
| 2017/0331577 | A1* | 11/2017 | Parkvall | H04L 5/1469 |
| 2017/0331670 | A1* | 11/2017 | Parkvall | H04L 41/0816 |
| 2018/0323860 | A1* | 11/2018 | Bohls | H04W 52/52 |
| 2018/0324785 | A1* | 11/2018 | Nammi | H04W 4/027 |
| 2018/0376383 | A1* | 12/2018 | Belghoul | H04W 76/16 |
| 2019/0082337 | A1* | 3/2019 | Gheorghiu | H04L 5/001 |
| 2019/0090299 | A1* | 3/2019 | Ang | H04W 52/0229 |
| 2019/0158137 | A1* | 5/2019 | Brunel | H04B 1/04 |
| 2019/0182702 | A1* | 6/2019 | Wang | H04W 28/0221 |
| 2019/0289513 | A1* | 9/2019 | Jeon | H04L 5/0098 |
| 2019/0312655 | A1* | 10/2019 | Harel | G01R 31/11 |
| 2019/0319653 | A1* | 10/2019 | Wyville | H04B 1/525 |
| 2020/0029377 | A1* | 1/2020 | Chow | H04W 8/24 |
| 2020/0100181 | A1* | 3/2020 | Jia | H04W 48/12 |
| 2020/0136732 | A1* | 4/2020 | Verma | H01Q 3/267 |
| 2020/0154442 | A1* | 5/2020 | Zhou | H04B 1/525 |
| 2020/0154466 | A1* | 5/2020 | John Wilson | H04L 5/0055 |
| 2020/0245387 | A1* | 7/2020 | Kwok | H04W 72/1278 |
| 2020/0259896 | A1* | 8/2020 | Sachs | H04J 3/0667 |
| 2020/0267665 | A1* | 8/2020 | Wei | H04W 52/365 |
| 2020/0336110 | A1* | 10/2020 | Drogi | H03F 3/19 |
| 2020/0350870 | A1* | 11/2020 | Ghanevati | H03F 1/223 |
| 2020/0351729 | A1* | 11/2020 | Rastegardoost | H04W 36/0072 |
| 2020/0382188 | A1* | 12/2020 | Stephenne | H04W 16/28 |
| 2020/0395962 | A1* | 12/2020 | Hitomi | H04B 1/0475 |
| 2020/0413305 | A1* | 12/2020 | Rahman | H04W 56/0045 |
| 2021/0014834 | A1* | 1/2021 | Akkarakaran | H04L 5/0023 |
| 2021/0058826 | A1* | 2/2021 | Mao | H04W 28/088 |
| 2021/0105633 | A1* | 4/2021 | Vaidya | H04W 72/541 |
| 2021/0185692 | A1* | 6/2021 | Stephenne | H04W 72/54 |
| 2021/0195541 | A1* | 6/2021 | Wei | H04W 72/21 |
| 2021/0203406 | A1* | 7/2021 | Tekgul | H04B 7/15557 |
| 2021/0227403 | A1* | 7/2021 | Tsui | H04W 24/02 |
| 2021/0258096 | A1* | 8/2021 | Mann | H04W 72/23 |
| 2021/0289580 | A1* | 9/2021 | Damnjanovic | H04W 76/14 |
| 2021/0298036 | A1* | 9/2021 | Luo | H04L 27/2607 |
| 2022/0116821 | A1* | 4/2022 | Wei | H04L 27/2636 |
| 2022/0131727 | A1* | 4/2022 | Khoryaev | H04L 27/261 |
| 2022/0150901 | A1* | 5/2022 | Wyville | H04B 1/109 |
| 2022/0159768 | A1* | 5/2022 | Zhu | H04L 1/1642 |
| 2022/0167369 | A1* | 5/2022 | Bin Sediq | H04W 72/542 |
| 2022/0191934 | A1* | 6/2022 | Miao | H04W 74/002 |

* cited by examiner

ENSURING QUALITY OF SERVICE FOR RELAY NODES

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-Wave or mmW) networks, as well as older legacy networks. In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is colocated with a 5G gNodeB at the same cell site or radio access network), or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, as wireless device technology improves, relay nodes are being deployed to improve service quality by relaying communication between an access node, and wireless devices in the wireless network. For example, relay nodes may be used at the edge of a coverage area of an access node to improve coverage and/or service, as well as in crowded areas having a high number of other wireless devices to increase the available throughput to the wireless devices being relayed. Relay nodes are generally configured to communicate with the serving access node (i.e. a "donor" access node) via a wireless connection, and to deploy a wireless air interface to which end-user wireless devices can attach. Relay nodes can include a combination of a relay wireless device physically coupled to a relay access point (AP). The relay wireless device provides the wireless connection between the AP and the donor access node, and such a wireless connection may be referred to as a wireless backhaul. Meanwhile the relay AP deploys the wireless air interface to which end-user wireless devices can attach. The relay wireless device can include a 5G-capable wireless device, thereby being able to avail of the aforementioned dual connectivity or EN-DC for a more robust wireless backhaul.

However, transitioning to these advanced technologies in today's heterogenous wireless networks can be associated with problems. In particular, since relay nodes serve increasing numbers of end-user wireless devices, it must be ensured that the relay nodes themselves are provided with a high quality wireless backhaul, that is, the wireless connection between the relay node and the donor access node. Such considerations are further complicated when a donor access node suffers from intermodulation distortion caused by various different sources. For example, donor access nodes configured to deploy multiple carriers/frequencies (including while operating in a dual-connectivity mode) may suffer from 3rd order intermodulation distortion caused at the antennae of the donor access node by products of the different frequencies. Further, passive intermodulation distortion can be caused by components of the donor access nodes themselves. 3rd order or passive intermodulation distortion can impact a quality of service provided by the donor access node. Particularly when relay nodes are serving many end-user wireless devices, and operating in dual-connectivity mode, the quality of service for the end-user wireless devices can also be impacted.

Overview

Exemplary embodiments described herein include methods, systems, and processing nodes for ensuring quality of service for relay nodes in wireless networks that suffer from intermodulation distortion. An exemplary method for ensuring service quality for a relay node includes monitoring an intermodulation distortion level for a first carrier deployed by a donor access node serving the relay node, and responsive to the intermodulation distortion level meeting a threshold, instructing the relay node to attach to a second carrier deployed by the donor access node.

Another exemplary method for ensuring service quality for relay nodes can include determining that an intermodulation distortion level measured at a donor access node meets a threshold, instructing relay nodes attached to a millimeter-wave (mmW) carrier deployed by the donor access node to attach to a lower-frequency carrier deployed by the donor access node, and instructing relay nodes not attached to the mmW carrier to avoid attaching to the mmW carrier.

An exemplary method for serving relay nodes in wireless networks suffering from intermodulation distortion includes determining that an intermodulation distortion level measured at the donor access node meets a threshold, and instructing relay nodes attached to a high-frequency carrier deployed by the donor access node to attach to a lower-frequency carrier deployed by the donor access node.

Another exemplary method for serving relay nodes in wireless networks includes instructing relay nodes to attach to a millimeter wave (mmW) carrier deployed by the donor access node when an intermodulation distortion level of the donor access node is below a first threshold, and instructing the relay nodes to detach from the mmW carrier when the intermodulation distortion level is above the threshold.

The exemplary embodiments described herein may be performed by a processing node within a system, such as a telecommunication system. For example, an exemplary system for ensuring quality of service for relay nodes in wireless networks suffering from intermodulation distortion can include at least a donor access node configured to serve one or more relay nodes, and a processing node communicatively coupled to the donor access node. The processing node can be configured to perform any of the aforementioned operations in any combination.

For example, an exemplary processing node described herein can be configured to perform operations including instructing relay nodes to attach to a mmW carrier deployed by the donor access node when an intermodulation distortion level of the donor access node is below a first threshold, and instructing the relay nodes to detach from the mmW carrier when the intermodulation distortion level is above the threshold.

Another exemplary processing node for ensuring service quality for a relay node can be configured to perform operations comprising monitoring an intermodulation distortion level for a first carrier deployed by a donor access node serving the relay node, and responsive to the intermodulation distortion level meeting a threshold, instructing the relay node to attach to a second carrier deployed by the donor access node.

In another exemplary embodiment, the processing node can be configured to perform operations for serving relay nodes in wireless networks suffering from intermodulation distortion by determining that an intermodulation distortion level measured at a donor access node meets a threshold, and instructing relay nodes attached to a high-frequency carrier deployed by the donor access node to attach to a lower-frequency carrier deployed by the donor access node.

DETAILED DESCRIPTION

Figure 1:
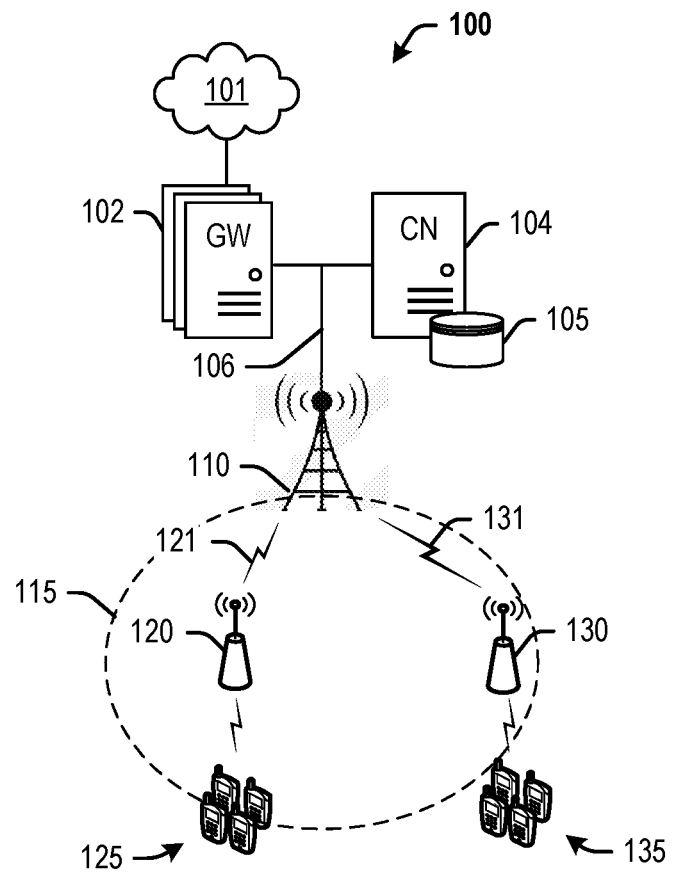
FIG. 1 depicts an exemplary system for ensuring quality of service for relay nodes in wireless networks that suffer from intermodulation distortion.

The following disclosure provides methods and systems for serving relay nodes by directing the relay nodes towards backhaul carriers that are not suffering from passive or 3rd order intermodulation distortion. If a 5G relay node is attached to a millimeter wave (mmW) donor access node (e.g. a gNodeB or a dual-connectivity eNodeB+gNodeB), and if the mmW gNodeB suffers from intermodulation distortion, then the 5G relay node will be instructed to attach to a lower-frequency carrier, or a different donor access node. The lower-frequency carrier can include another 5G carrier deployed by the same donor access node, or a 4G carrier or any other carrier. For the purposes of this disclosure, the terms "high", "higher", "low" and "lower" are to be construed as being relative to a reference level. For example, a lower-frequency carrier is a carrier that has a lower frequency than a higher-frequency carrier, such as a mmW carrier. Incrementally-lower frequencies are possible depending on different thresholds of intermodulation distortion. Since intermodulation distortion can negatively impact the service quality for 5G relay nodes, instructing the relay nodes to attach to other carriers (deployed by the same or different donor access nodes) can improve performance of the relay nodes and, therefore, end-user wireless devices attached to the relay nodes.

Exemplary wireless networks described herein include donor access nodes and relay nodes that are capable of communicating using a plurality of wireless air interfaces or RATs. For example, a donor access node can include a combination of a 4G eNodeB and a 5G gNodeB. In other words, the access node can be configured to communicate using 4G LTE as well using 5G NR. In some embodiments, the donor access node can include a 4G eNodeB coupled to a plurality of 5G gNodeBs (one-to-many configuration). In similar embodiments, the donor access nodes can be selected from either the eNodeB or one of the 5G gNodeBs. Thus, as further described herein, the donor access nodes can be part of the same or different cell sites or radio access networks (RANs), each RAN being served by a different cell site router. Exemplary donor access nodes described herein include schedulers that are configured to perform control resource allocations, data resource allocations, or both, and coupled to different types of donor access nodes including eNodeBs, gNodeBs, etc. For example, each donor access node can include a primary access node configured to deploy carriers utilizing the a first RAT, and the primary access node is coupled to one or more secondary access nodes, each secondary access node configured to deploy carriers utilizing a second RAT. Alternatively, each donor access node comprises a secondary access node configured to deploy carriers utilizing the second RAT, the secondary access node being coupled to a primary access node configured to deploy carriers utilizing the first RAT.

Thus, exemplary systems described herein for serving relay nodes include one or more donor access nodes configured to deploy at least a 4G wireless air interface and a 5G wireless air interface, and a processing node communicatively coupled to the donor access node(s). The processing node can be configured to perform operations including monitoring an intermodulation distortion level for a first carrier deployed by a donor access node serving the relay node, and responsive to the intermodulation distortion level meeting a threshold, instructing the relay node to attach to a second carrier deployed by the donor access node, or by any other donor access node. The intermodulation distortion level can be associated with one or more of a passive intermodulation (PIM) distortion or a third or higher-order intermodulation distortion. For example, the third order distortion is associated with a combination of the first carrier and at least one other carrier deployed by the donor access node.

The operations can include instructing the relay node to detach from the first carrier. In an exemplary embodiment, the first carrier is configured to utilize millimeter wave (mmW) frequencies. Therefore, another method for mitigating the effects of intermodulation distortion on relay nodes can include determining that an intermodulation distortion level measured at a donor access node meets a threshold, instructing relay nodes attached to a mmW carrier deployed by the donor access node to attach to a lower-frequency carrier deployed by the donor access node, and instructing relay nodes not attached to the mmW carrier to avoid attaching to the mmW carrier. Further the operations include treating different relay nodes depending on whether or not they are near a cell edge of the coverage area of the donor access node. For example, for relay nodes within a threshold distance of the donor access node (i.e. not close to the cell edge), the first carrier (e.g. mmW carrier) can be configured as a default carrier for the relay node. Whereas, when the relay node is located towards a cell edge of the donor access node, operations can include configuring a lower-frequency carrier as a default carrier for the relay node, and instructing the relay node to attach to the first carrier (e.g. higher frequency or mmW carrier) if the distortion level remains below the threshold.

Further, in the dual-connectivity systems described herein, the relay node can be instructed to attach to the second carrier as a primary carrier using the dual connectivity operating mode, or to attach to the second carrier and disengage the dual connectivity operating mode. This determination can depend on the intermodulation distortion exceeding different thresholds. In the exemplary embodiments described herein, the intermodulation distortion level is measured at the donor access node, e.g. at one or more antennae coupled to the donor access node. These and other embodiments are further described herein and with reference to FIGS. 1-11.

FIG. 1 depicts an exemplary system 100 comprising a communication network 101, gateway 102, controller node 104, access node 110, relay nodes 120, 130, and wireless devices 125, 135. In this exemplary embodiment, access node 110 may be macrocell access nodes configured to deploy wireless air interfaces to which relay nodes 120, 130 (and other wireless devices not shown herein) can attach and access network services from network 101. Relay nodes 120, 130 may be configured to communicate with access node 110 over communication links 121, 121 respectively, referred to as wireless backhaul, and are further configured to deploy additional wireless air-interfaces to which wireless devices 125, 135 can attach. Relay nodes 120, 130 are thus configured to relay data between a donor access node 110 and wireless devices 125, 135, such that wireless devices 125, 135 may access network services using any one of relay nodes 120, 130 rather than overload donor access node 110 (which may be serving numerous other devices not shown herein). Moreover, wireless devices that are outside a coverage area 115 of access node 110 may access network services from donor access node 110 by virtue of being connected to one of relay nodes 120, 130. Although only access node 110, relay nodes 120, 130, and end-user wireless devices 125, 135 are illustrated in FIG. 1, system 100 can include various other combinations of carriers/wireless air interfaces, antenna elements, access nodes, and wireless devices, as may be evident to those having ordinary skill in the art in light of this disclosure.

Further, access node 110 may be configured to deploy at least two wireless air interfaces using dual connectivity. For example, access node 110 can include a combination of an eNodeB and a gNodeB, such that each access node is be configured to deploy a wireless air interface using a first RAT (e.g. 4G LTE) and a second RAT (e.g. 5G NR). Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Further, access node 110 can be configured to communicate using both RATs at the same time. For example, dual connections can be set up with one or both of relay nodes 120, 130 using both 4G and 5G wireless air interfaces, with the 4G wireless air interface being used to transmit control information, and the 5G wireless air interface being used to transmit data information. In another example, either control or data transmissions may be transmitted using either 4G or 5G wireless air interface. In another example, a standalone 5G access node may be configured to deploy multiple 5G wireless air interfaces. For example, wireless communication links 121 and 131 may each comprise a dual-connectivity connection using any combination of 4G and 5G carriers, with 5G carriers including mmW carriers. Other implementations may be evident to those having ordinary skill in the art in light of this disclosure.

A processing node within system 100 (for example, communicatively coupled to access node 110 or any other network node) can be configured to determine whether or not each relay node 120, 130 is capable of dual connectivity and/or communication using 5G NR, and instruct the donor access node 110 to broadcast an indicator in, for example, a system information message. Responsive to the indicator, relay nodes 120, 130 can attach to donor access node 110 using the 4G wireless air interface to control and set up a dual connectivity session. In other words, control information (including SIB messages) is transmitted using the 4G LTE wireless air interface, while the 5G NR wireless air interface is utilized for transmission of data. Using the 5G RAT for data transmissions is advantageous, as 5G provides higher bandwidths and frequencies versus 4G.

In an exemplary embodiment, the processing node is further is configured to perform operations for monitoring an intermodulation distortion level for a first carrier deployed by donor access node 110 serving the relay nodes 120, 130, and responsive to the intermodulation distortion level meeting a threshold, instructing the relay nodes 120, 130 to attach to a second carrier deployed by the donor access node 110, or by any other donor access node (not shown herein). The intermodulation distortion level can be associated with one or more of a passive intermodulation (PIM) distortion or a third or higher-order intermodulation distortion. For example, the third order distortion is associated with a combination of the first carrier and at least one other carrier deployed by the donor access node. The intermodulation distortion is monitored at one or more antennae of the donor access node 110. Responsive to the intermodulation distortion reaching one or more thresholds, a relay node 120, 130 can be instructed to detach from the first carrier. In an exemplary embodiment, the first carrier is configured to utilize mmW frequencies, and the relay node 120, 130 can be instructed to attach to a lower-frequency carrier deployed by the donor access node 110. Further, if relay node 120, 130 is not attached to the mmW carrier, the relay node 120, 130 can be instructed to avoid attaching to the mmW carrier. These instructions can include adjusting handover thresholds, such as A1, A4, etc. to trigger or prevent handovers to different carriers.

Further different relay node 120, 130 can be treated differently depending on whether or not they are near a cell edge of the coverage area 115 of the donor access node 110. For example, relay node 120 is illustrated as being closer to donor access node 110 than relay node 130, and may be within a threshold distance of donor access node 110. Therefore, relay node 120 may be assigned a default carrier as a high-frequency carrier (e.g. the mmW carrier), and upon the intermodulation distortion level of donor access node 110 reaching the threshold, relay node 120 can be instructed to attach to a different (e.g. lower-frequency) carrier. Conversely, relay node 130 is illustrated as being located towards a cell edge of the coverage area 115, and therefore can be assigned a lower-frequency carrier as a default carrier, since high frequencies are not optimal for traversing large distances, and lower frequencies may be more effective for cell-edge relay nodes. In certain situations where the intermodulation distortion level is below one or more thresholds, the relay node 130 may be instructed to attach to the higher frequency (e.g. mmW carrier), while if the distortion level rises, the default carrier is assigned. As described above, the assignment of a carrier (as well as selection of new carrier and/or donor access node) may be performed using handover threshold adjustments, radio resource control (RRC) configuration messages, or any other method. Further, each relay node 120, 130 can be instructed to attach to the second carrier as a primary carrier using the dual connectivity operating mode, or to attach to the second carrier and disengage the dual connectivity operating mode. This determination can depend on the intermodulation distortion exceeding different thresholds.

Access node 110 can be any network node configured to provide communication between relay nodes 120, 130 (and end-user wireless devices 125, 135 attached thereto) and communication network 101, including standard access nodes such as a macro-cell access node, base transceiver station, a radio base station, an eNodeB device, an enhanced eNodeB device, an a next generation NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access node such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with each other, and other access nodes (not shown), using a wireless link or a wired link such as an X2 link. Components of exemplary access node 110 and processing nodes coupled thereto are further described with reference to FIGS. 2-3.

Wireless devices 125, 135 may be any device, system, combination of devices, or other such communication platform capable of communicating wirelessly with relay nodes 120, 130 and/or access node 110 using one or more frequency bands deployed therefrom. Wireless devices 125, 135 may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 125, 135. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path-including combinations thereof. Communication link 106 can be wired or wireless and use various communication protocols such as Internet, Internet protocol (IP), local-area network (LAN), S1, optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication link 106 can be direct links or might include various equipment, intermediate components, systems, and networks, such as a cell site router, etc. Communication link 106 may comprise many different signals sharing the same link. Communication link 106 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as capabilities of relay nodes 120, 130 and end-user wireless devices attached thereto, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, relay nodes 120, 130, gateway(s) 102, controller node 104, and/or network 101.

Figure 2:
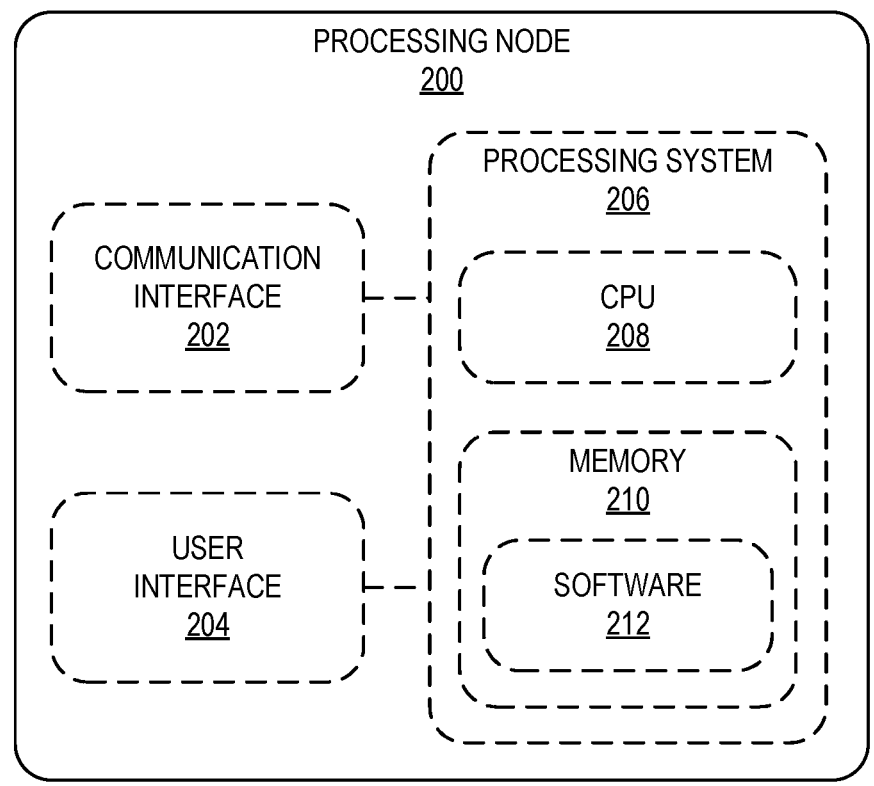
FIG. 2 depicts an exemplary processing node for ensuring quality of service for relay nodes in wireless networks that suffer from intermodulation distortion.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for ensuring service quality for a relay node by monitoring an intermodulation distortion level for a first carrier deployed by a donor access node serving the relay node, and responsive to the intermodulation distortion level meeting a threshold, instructing the relay node to attach to a second carrier deployed by the donor access node. In another exemplary embodiment, software 212 can include instructions for ensuring service quality for relay nodes by determining that an intermodulation distortion level measured at a donor access node meets a threshold, instructing relay nodes attached to a millimeter-wave (mmW) carrier deployed by the donor access node to attach to a lower-frequency carrier deployed by the donor access node, and instructing relay nodes not attached to the mmW carrier to avoid attaching to the mmW carrier. In another exemplary embodiment, software 212 can include instructions for serving relay nodes in wireless networks suffering from intermodulation distortion by determining that an intermodulation distortion level measured at the donor access node meets a threshold, and instructing relay nodes attached to a high-frequency carrier deployed by the donor access node to attach to a lower-frequency carrier deployed by the donor access node. In another exemplary embodiment, software 212 can include instructions for serving relay nodes in wireless networks includes instructing relay nodes to attach to a millimeter wave (mmW) carrier deployed by the donor access node when an intermodulation distortion level of the donor access node is below a first threshold, and instructing the relay nodes to detach from the mmW carrier when the intermodulation distortion level is above the threshold.

Figure 3:
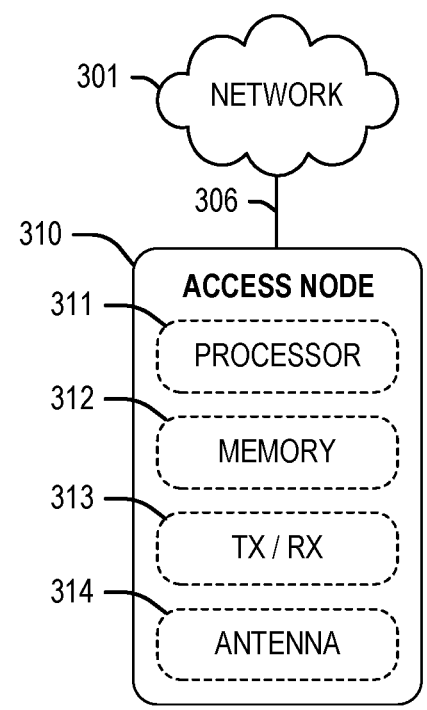
FIG. 3 depicts an exemplary access node for ensuring quality of service for relay nodes in wireless networks that suffer from intermodulation distortion.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, a transceiver 313, and antennae 314 (hereinafter referred to as antenna elements 314). Processor 311 executes instructions stored on memory 312, and transceiver 313 (in conjunction with antenna elements 314) enable wireless communication respectively at least two wireless air interfaces, such as 4G LTE and 5G NR. For example, access node 310 may be configured to transmit control information using a first set of antennae elements 314 configured to utilize a 4G LTE interface, and data information using a second set of antennae elements 314 configured to utilize a 5G NR air interface. Alternatively or in addition, each separate air interface maintains its own control and data transmissions. Further, antenna elements 314 may include an array of antenna elements that are configured to deploy air interfaces over one or more wireless sectors, form beams within these sectors, employ multiple-input-multiple-output (MIMO), etc. The 5G NR wireless air interface can be configured to utilize mmW frequencies.

In an exemplary embodiment, memory 312 can store instructions for ensuring service quality for a relay node by monitoring an intermodulation distortion level for a first carrier deployed by a donor access node serving the relay node, and responsive to the intermodulation distortion level meeting a threshold, instructing the relay node to attach to a second carrier deployed by the donor access node. In another exemplary embodiment, memory 312 can include instructions for ensuring service quality for relay nodes by determining that an intermodulation distortion level measured at a donor access node meets a threshold, instructing relay nodes attached to a millimeter-wave (mmW) carrier deployed by the donor access node to attach to a lower-frequency carrier deployed by the donor access node, and instructing relay nodes not attached to the mmW carrier to avoid attaching to the mmW carrier. In another exemplary embodiment, memory 312 can include instructions for serving relay nodes in wireless networks suffering from intermodulation distortion by determining that an intermodulation distortion level measured at the donor access node meets a threshold, and instructing relay nodes attached to a high-frequency carrier deployed by the donor access node to attach to a lower-frequency carrier deployed by the donor access node. In another exemplary embodiment, memory 312 can include instructions for serving relay nodes in wireless networks includes instructing relay nodes to attach to a millimeter wave (mmW) carrier deployed by the donor access node when an intermodulation distortion level of the donor access node is below a first threshold, and instructing the relay nodes to detach from the mmW carrier when the intermodulation distortion level is above the threshold.

Figure 4:
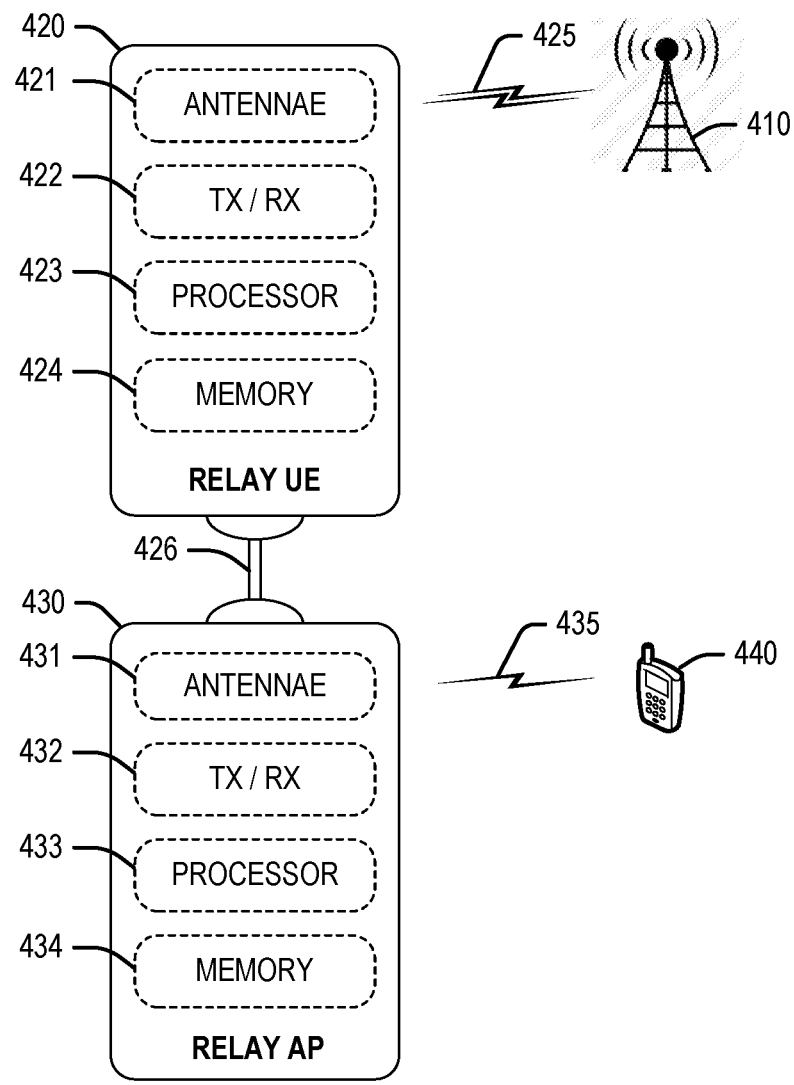
FIG. 4 depicts an exemplary relay node.

FIG. 4 depicts an exemplary relay node comprising a relay wireless device (UE) 420 and a relay access point (AP) 430. Relay wireless device 420 is illustrated as comprising an antenna 421 for direct (i.e. unrelayed) communication with donor access node 410 via wireless backhaul link 425, a transceiver 422, a processor 423, and a memory 424 for storing instructions that enable relay wireless device 420 to perform operations described herein. In some embodiments, relay wireless device 420 is referred to as a customer premise equipment (CPE), which includes any stationary LTE wireless device having a stronger computational & RF capability versus standard wireless devices, as well as a directional antenna and a dedicated power supply, enabling relay wireless device 420 to efficiently provide resources to wireless device 440 via relay access point 430. Consequently, relay access point 430 may be co-located with relay wireless device 420, and is connected to relay wireless device 420 via a communication interface 426. Communication interface 426 may be any interface that enables direct communication between relay wireless device 420 and relay access point 430, such as USB, FireWire, Ethernet, or any other serial, parallel, analog, or digital interface. Transceivers 422 can include transceivers capable of dual connectivity. For example, transceivers 422 can include a combination of transceivers capable of communicating via 4G LTE and 5G NR simultaneously. Antennae 421 can be similarly enabled for 5G EN-DC transmissions.

In operation, relay wireless device 420 may be configured to relay network services from donor access node 410 to wireless device 440 via relay access point 430. Relay wireless device 420 may begin to function as a relay wireless device by sending a message to donor access node 410 to indicate to donor access node 410 that wireless device 420 is functioning as a relay wireless device. In some embodiments, relay wireless device 420 can request to send a buffer status report to donor access node 410. Donor access node 410 can grant this request in a conventional manner. Relay wireless device 420 may respond to the grant by sending a short buffer status report. This short buffer status report is associated with a logical channel group that indicates the buffer status report is communicating the status of relay wireless device 420 as a relay, and thus is not asking for additional resource allocations (like a 'conventional' buffer status report would indicate). In other words, when relay wireless device 420 responds with a buffer status report for the 'special' logical channel group, it means that the buffer status report is not actually reporting the status of a buffer. Rather, this buffer status report indicates that the wireless device is now functioning as a relay. Once status of relay wireless device 420 is established, relay wireless device 420 may instruct relay access point 430 to start accepting connection requests from one or more wireless devices such as wireless device 440. Further, based on the indication of relay status, donor access node 410 may alter how relay wireless device 420 is treated. For example, relay wireless device 420 may be provided with preferential treatment because it is functioning as a relay. Further, memory 424 can include instructions for transmitting an identifier of relay wireless device 420 to donor access node 410, such as a QCI, PCI, or PLMN ID. Further, memory 424 can include instructions for receiving instructions from donor access node 410 to attach to carriers using different frequencies, based on intermodulation distortion measured at donor access node 410.

Relay access point 430 is illustrated as comprising an antenna 431 and transceiver 432 for enabling communication with wireless device 440, processor 433, and a memory 434 for storing instructions that are executed by processor 433. In some embodiments, relay access point 430 may be a home eNodeB. Moreover, although only one transceiver is depicted in each of relay wireless device 420 and relay access point 430, additional transceivers may be incorporated in order to facilitate communication across interface 426 and other network elements.

Figure 5:
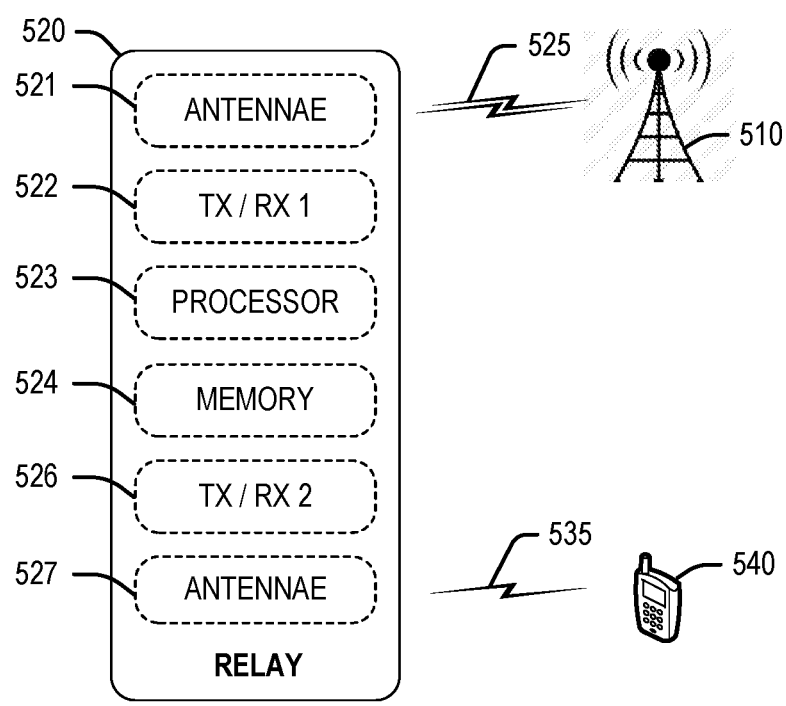
FIG. 5 depicts another exemplary relay node.

In another exemplary embodiment, the relay node may integrate components of a relay wireless device and a relay access point into a single unit. FIG. 5 depicts such an exemplary relay node 520. Relay node 520 is illustrated as comprising an antenna 521 for direct (i.e. unrelayed) communication with donor access node 510 via wireless backhaul link 525, a transceiver 522, a processor 523, and a memory 524 for storing instructions that are executed by processor 522 as described herein. Relay node 520 further includes another transceiver 526 and antenna 527 for enabling communication with wireless device 540. Relay node 520 can perform operations similar to those described with respect to FIG. 4.

In an embodiment, the relay nodes depicted in FIG. 4-5 can be configured to function as one or more of a layer 1 (L1), layer 2 (L2), or layer 3 (L3) relay. A layer 1 relay functions as a booster or repeater. In other words, a layer 1 relay node performs an amplify and forward (AF) function. RF signals received from a donor access node are amplified and transmitted to wireless devices. Likewise, RF signals received from wireless devices are amplified and transmitted to donor access nodes. Alternatively or in addition, a layer 2 relay node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay node also performs a decode and forward function. However, a layer 3 relay node also performs additional processing (such as ciphering and/or data concatenation/segmentation/resassembly). In other words, relay node depicted herein performs demodulation and decoding of the received RF signals (either uplink or downlink), processes received data, then encodes, modulates, and transmits the data to a wireless device.

Figure 6:
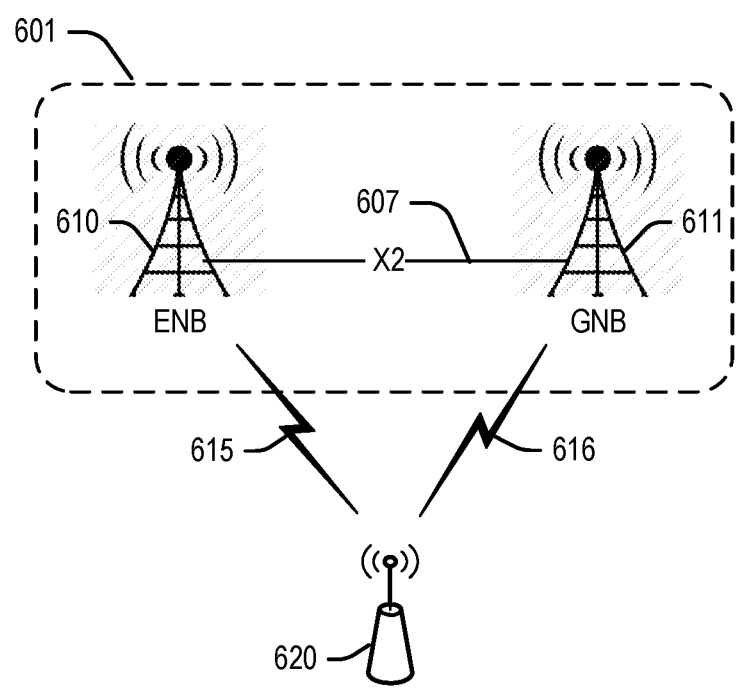
FIG. 6 depicts an exemplary dual-connectivity radio access network for providing service to a relay node.

FIG. 6 depicts an exemplary 5G EN-DC radio access network (RAN) 601 with colocated access nodes. RAN 601 can include other components not shown herein for convenience, such as cell site routers, controllers, etc. Further, RAN 601 may be connected to other intermediate or core networks. In this exemplary embodiment, the collocated access nodes can include a eNodeB 610, and a gNodeB 611. For example, eNodeB 610 can be configured to deploy a wireless air interface 615 using a first radio access technology (RAT), e.g. 4G LTE, and gNodeB 611 can be configured to deploy a second wireless air interface 616 using a second RAT, e.g. 5G NR and/or mmW. Each RAT can be configured to utilize a different frequency band or sub-band, a different channel size or bandwidth, and so on. For example, the 5G NR wireless air interface 616 can be configured to utilize higher frequencies and larger channel bandwidths than the 4G LTE wireless interface 615. In an exemplary embodiment, the 5G NR wireless interface can be configured to utilize mmW frequencies.

Further, eNodeB 610 and gNodeB 611 can be configured to communicate using both RATs at the same time. For example, dual connections can be set up with any of relay nodes 620, 630 using both 4G and 5G wireless air interfaces 615, 625 respectively, the 4G wireless air interface 615 being used to transmit control information, and the 5G wireless air interface 616 being used to transmit data information. For example, a processing node within RAN 601 (for example, communicatively coupled to eNodeB 610 and gNodeB 611, or any other network node) can be configured to determine whether or not relay nodes 620, 630 are capable of communicating using both RATs (e.g. capable of 5G EN-DC), and instruct the eNodeB 610 to broadcast an indicator in, for example, a system information message. Responsive to the indicator, relay nodes 620, 630 can attach to eNodeB 610 which can use the 4G carrier to control and set up a dual connectivity session with the relay node 620, 630. In other words, control information (including SIB messages) is transmitted from the eNodeB 610 using the 4G LTE air interface, while the 5G NR air interface is utilized for transmission of data via gNodeB 611. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth.

Further, within radio access network 602, eNodeB 610 and gNodeB 611 can be coupled via a direct communication link 607, which can include an X2 communication link for communicating control and data information. In an exemplary embodiment, gNodeB 611 includes logic to determine how to allocate data packets between eNodeB 610 and gNodeB 611, wherein the data packets flow between relay nodes 620, 630 and any external network node. Such logic may include a packet data convergence protocol (PDCP) function. Thus, RAN 601 can include a plurality of antenna elements (not shown herein) coupled to eNodeB 610 and gNodeB 611, with different antenna elements configured to deploy a different radio air interface using a different frequency.

Thus, the processing node within RAN 601 can be configured to perform operations for monitoring an intermodulation distortion level for a first carrier deployed by one or both of eNodeB 610 or gNodeB 611 and, responsive to the intermodulation distortion level meeting a threshold, instructing the relay node 620 to attach to a second carrier deployed by eNodeB 610 or gNodeB 611 (or by any other donor access node not shown herein). The intermodulation distortion level can be associated with one or more of a passive intermodulation (PIM) distortion or a third or higher-order intermodulation distortion. For example, the third order distortion is associated with a combination of a high-frequency carrier (e.g. 5G carrier on wireless air interface 616) and at least one other carrier deployed by the donor access node (e.g. 4G LTE carrier on wireless air interface 615). The intermodulation distortion is monitored at one or more antennae of the eNodeB 610 or gNodeB 611. Responsive to the intermodulation distortion reaching one or more thresholds, relay node 620 can be instructed to detach from the high frequency carrier. In an exemplary embodiment, the high frequency carrier is configured to utilize mmW frequencies, and the relay node 620 can be instructed to attach to a lower-frequency carrier deployed by, for example, eNodeB 610 (i.e. 4G LTE carrier on wireless air interface 615) Alternatively or in addition, the relay node 620 can be instructed to attach to a lower-frequency carrier deployed by gNodeB 611, i.e. a lower-frequency 5G NR carrier. The relay node 620 can be instructed to attach to any combination of carriers on wireless air interfaces 615, 616 using dual connectivity, so long as the carriers do not include the mmW carrier (or any high-frequency carrier which is suffering from intermodulation distortion). In an exemplary embodiment, of the intermodulation distortion exceeds further thresholds, the relay node 620 can be instructed to disable dual-connectivity and only attach to a single lower-frequency carrier. Further, if relay node 620 is not attached to the mmW carrier, the relay node 620 can be instructed to avoid attaching to the mmW carrier. These instructions can include adjusting handover thresholds, such as A1, A4, etc. to trigger or prevent handovers to different carriers.

Figure 7:
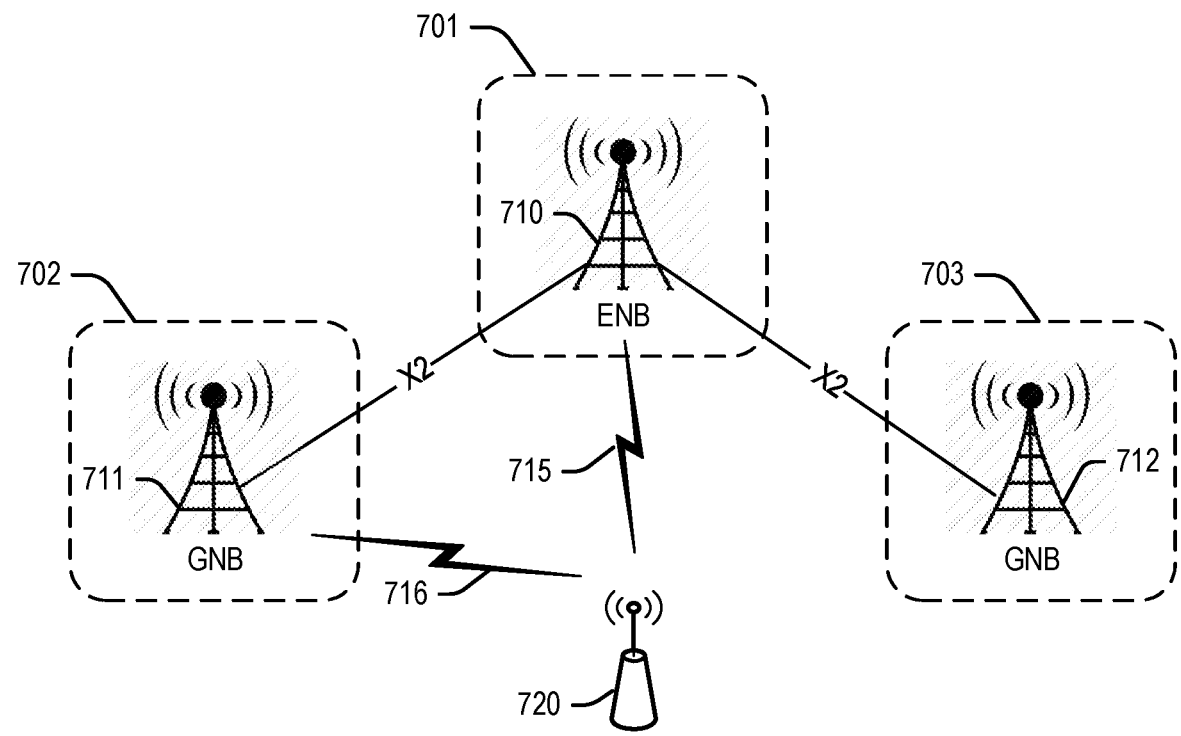
FIG. 7 depicts another exemplary dual-connectivity radio access network for providing service to a relay node.

FIG. 7 depicts another 5G EN-DC system using distributed access nodes. Each of RANs 701, 702, 703 includes at least one access node. This embodiment depicts a one-to-many configuration, in which an eNodeB 710 is designated as a primary donor access node for wireless devices and relay nodes (such as relay node 720), and one or more gNodeBs 711, 712 are selected as secondary donor access nodes, as further described below. Persons having ordinary skill in the art may note that other components may be included in any combination, without materially affecting the scope and spirit of the described embodiments.

In this exemplary embodiment, access node 710 can include a eNodeB, and access nodes 711, 712 can include gNodeBs. For example, eNodeB 710 can be configured to deploy a wireless interface 715 using a first radio access technology (RAT), e.g. 4G LTE, and gNodeB access nodes 711, 712 can be configured to deploy wireless interfaces using a second RAT, e.g. 5G NR. Further, access nodes 710, 711, 712 can be configured to communicate using both RATs at the same time. For example, dual connections can be set up with one or both of relay nodes 720, 730 using both 4G and 5G air interfaces respectively, the 4G wireless interface 715 being used to transmit control information, and one of the 5G wireless interfaces (e.g. 5G interface 716) being used to transmit data information. For example, a processing node communicatively coupled to eNodeB 710 can be configured to determine whether or not relay node 720 is capable of communicating using both RATs (e.g. capable of 5G EN-DC), and instruct the eNodeB 710 to broadcast an indicator in, for example, a system information message. Responsive to the indicator, relay node 720 can attach to eNodeB 710 which can use the 4G carrier to control and set up a dual connectivity session with relay node 720. Further, eNodeB 710 can be configured to select one (or more) of gNodeB access nodes 711, 712 as a secondary donor access node, to transport user data. In other words, control information (including SIB messages) is transmitted from the eNodeB node 710 using the 4G LTE air interface, while the 5G NR air interfaces (e.g. 5G NR air interface 716) is utilized for transmission of data. Further, gNodeB access nodes 711 and 712 (hereinafter "secondary donor access nodes") can each be coupled to access node 710 (hereinafter "primary donor access node") via X2 communication links. In an exemplary embodiment, each secondary donor access node 711, 712 can include logic to determine how to allocate data packets between the donor access nodes, wherein the data packets flow between relay node 720 and a network node not shown herein. Such logic may include a packet data convergence protocol (PDCP) function.

Further, a processing node communicatively coupled to any of access nodes 710, 711, 712 can be configured to perform operations for monitoring an intermodulation distortion level for a first carrier deployed by one or both of gNodeBs 711, 712, and responsive to the intermodulation distortion level meeting a threshold, instructing the relay node 720 to attach to a lower-frequency carrier, e.g. a 4G LTE carrier deployed by eNodeB 710, or another lower-frequency carrier deployed by, for example, gNodeB 712. These instructions can include adjusting handover thresholds, such as A1, A4, etc. to trigger or prevent handovers to different carriers. Various other combinations of these operations may be envisioned by those having ordinary skill in the art in light of this disclosure, including the operations further described below with reference to FIGS. 8-11.

Figure 8:
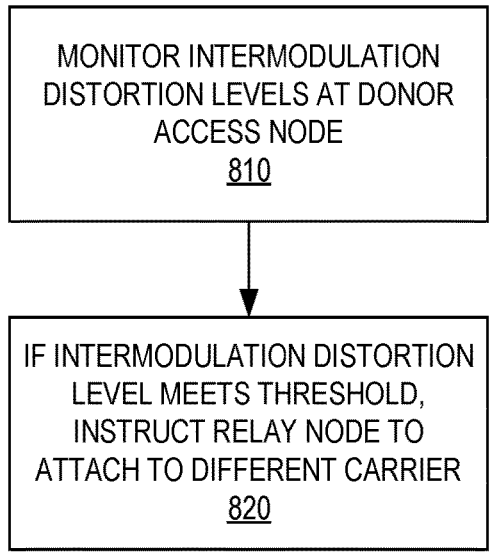
FIG. 8 depicts an exemplary method for ensuring quality of service for relay nodes in wireless networks that suffer from intermodulation distortion.

FIG. 8 depicts an exemplary method for serving relay nodes in wireless networks suffering from intermodulation distortion. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, an intermodulation distortion level is monitored at a donor access node serving one or more relay nodes and, at 820, if the intermodulation distortion level meets a threshold, the relay node is instructed to attach to a different carrier. For example, if a 5G relay node is attached to a millimeter wave (mmW) donor access node (e.g. a gNodeB or a dual-connectivity eNodeB+gNodeB), and if the mmW gNodeB suffers from intermodulation distortion, then the 5G relay node will be instructed to attach to a lower-frequency carrier, or a different donor access node. The lower-frequency carrier can include another 5G carrier deployed by the same donor access node, or a 4G carrier or any other carrier.

Figure 9:
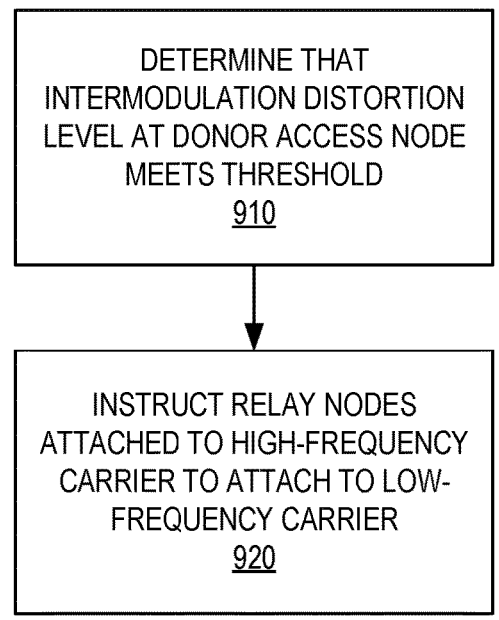
FIG. 9 depicts another exemplary method for ensuring quality of service for relay nodes in wireless networks that suffer from intermodulation distortion.

FIG. 9 depicts another exemplary method for serving relay nodes in wireless networks suffering from intermodulation distortion. The method of FIG. 9 may be implemented by a processing node communicatively coupled to one or more access nodes, controller nodes, or any other network node. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, it is determined that an intermodulation distortion level at a donor access node meets a threshold, and at 920, relay nodes attached to a high-frequency carrier are instructed to attach to a lower-frequency carrier. For example, if a 5G relay node is attached to a millimeter wave (mmW) donor access node (e.g. a gNodeB or a dual-connectivity eNodeB+gNodeB), and if the mmW gNodeB suffers from intermodulation distortion, then the 5G relay node will be instructed to attach to a lower-frequency carrier, or a different donor access node. The lower-frequency carrier can include another 5G carrier deployed by the same donor access node, or a 4G carrier or any other carrier. For the purposes of this embodiment, the terms "high", "higher", "low" and "lower" are to be construed as being relative to a reference level. For example, a lower-frequency carrier is a carrier that has a lower frequency than a higher-frequency carrier, such as a mmW carrier. Incrementally-lower frequencies are possible depending on different thresholds of intermodulation distortion. Since intermodulation distortion can negatively impact the service quality for 5G relay nodes, instructing the relay nodes to attach to other carriers (deployed by the same or different donor access nodes) can improve performance of the relay nodes and, therefore, end-user wireless devices attached to the relay nodes.

Figure 10:
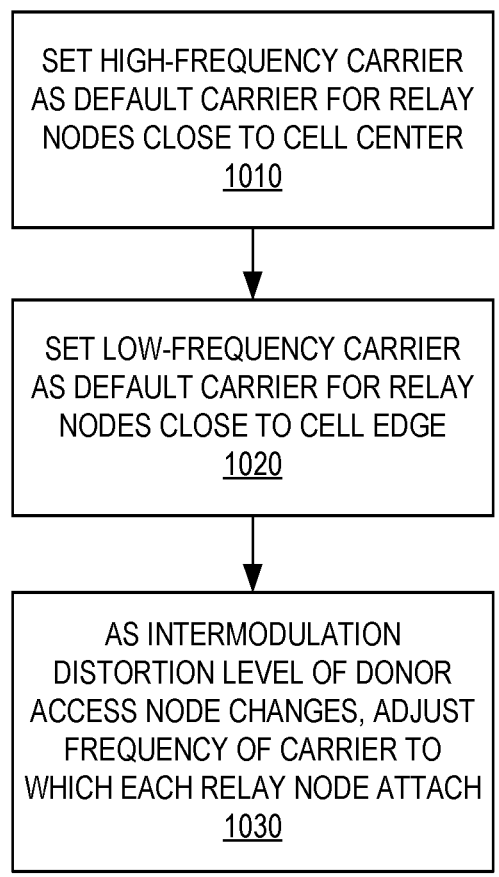
FIG. 10 depicts another exemplary method for ensuring quality of service for relay nodes in wireless networks that suffer from intermodulation distortion.

FIG. 10 depicts another exemplary method for ensuring quality of service for relay nodes in wireless networks suffering from intermodulation distortion. The method of FIG. 10 may be implemented by a processing node communicatively coupled to one or more access nodes, controller nodes, or any other network node. Although FIG. 10 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1010, a high-frequency carrier is set as a default carrier for relay nodes close to a cell center and, at 1020, a low-frequency carrier is set as a default carrier for relay nodes closer to a cell edge. Thus, different relay nodes can be treated differently depending on whether or not they are near a cell edge of the coverage area of the donor access node. For example, a first relay node closer to donor access node than a second relay node further away from a threshold distance of the donor access node. Therefore, the first relay node may be assigned a default carrier as a mmW carrier since the relay node can utilize the higher frequencies to serve more end-user wireless devices. Whereas, the second relay node can be assigned a lower-frequency carrier as a default carrier, since high frequencies are not optimal for traversing large distances, and lower frequencies may be more effective for cell-edge relay nodes.

At 1030, upon the intermodulation distortion level of donor access node changes, each relay node can be instructed to attach to a different carrier. In certain situations where the intermodulation distortion level is below one or more thresholds, the second relay node closer to the cell edge may be instructed to attach to a higher frequency (e.g. mmW carrier), while if the distortion level rises, the default carrier is assigned. Whereas, in the same situation, the first relay node maintains its connection to the high-frequency carrier when the intermodulation distortion level is below a threshold, and is instructed to switch to a lower-frequency carrier when the intermodulation distortion level rises above the threshold. As described above, the assignment of a carrier (as well as selection of new carrier and/or donor access node) may be performed using handover threshold adjustments, radio resource control (RRC) configuration messages, or any other method. Further, each relay node can be instructed to attach to the second carrier as a primary carrier using the dual connectivity operating mode, or to attach to the second carrier and disengage the dual connectivity operating mode. This determination can depend on the intermodulation distortion exceeding different thresholds.

While 4G LTE and 5G NR are described in the above embodiments, the disclosed operations may apply to different combinations of radio air interfaces, including any combination of radio air interfaces within the same or different radio-access technologies, such as multiple different 4G carriers with different bandwidths, 5G carriers with different bandwidths, or any future wireless technology. So long as the described allocations of resources for relay nodes serving end-user wireless devices having different bandwidth capabilities is performed as described herein, the specific implementation and network topology is less relevant.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for ensuring service quality for a relay node, the method comprising,
    measuring an intermodulation distortion level at a donor access node for a first carrier deployed by the donor access node serving the relay node; and
    responsive to the intermodulation distortion level measurement at the donor access node being above a threshold, instructing the relay node to attach to a second lower-frequency carrier deployed by the donor access node.

2. The method of claim 1, wherein the intermodulation distortion level is associated with one or more of a passive intermodulation (PIM) distortion or a third or higher-order intermodulation distortion.

3. The method of claim 2, wherein the third order distortion is associated with a combination of the first carrier and at least one other carrier deployed by the donor access node.

4. The method of claim 3, further comprising instructing the relay node to detach from the first carrier.

5. The method of claim 1, wherein the first carrier is configured to utilize millimeter wave (mmW) frequencies.

6. The method of claim 5, wherein the first carrier is configured as a default carrier for the relay node.

7. The method of claim 5, wherein the relay node is located towards a cell edge of the donor access node, the method further comprising:
    configuring a lower-frequency carrier as a default carrier for the relay node; and
    instructing the relay node to attach to the first carrier if the intermodulation distortion level remains below the threshold.

8. The method of claim 1, wherein the donor access node and the relay node are configured to utilize a dual connectivity operating mode using at least the first carrier and at least one other carrier.

9. The method of claim 8, further comprising instructing the relay node to attach to the second lower-frequency carrier as a primary carrier using the dual connectivity operating mode.

10. The method of claim 8, further comprising instructing the relay node to attach to the second lower-frequency carrier and disengage the dual connectivity operating mode.

11. The method of claim 1, wherein the intermodulation distortion level is measured at the donor access node.

12. A system for serving relay nodes in wireless networks suffering from intermodulation distortion, the system comprising:
    a donor access node serving one or more relay nodes; and
    a processing node coupled to the donor access node, the processing node configured to perform operations comprising:
        determining that an intermodulation distortion level measured at the donor access node is above a threshold; and
        responsive to the intermodulation distortion level measured at the donor access node being above the threshold, instructing relay nodes attached to a high-frequency carrier deployed by the donor access node to attach to a lower-frequency carrier deployed by the donor access node.

13. The system of claim 12, wherein the intermodulation distortion level is associated with the high-frequency carrier.

14. The system of claim 13, wherein the high-frequency carrier comprises a millimeter-wave (mmW) carrier.

15. The system of claim 14, wherein the lower-frequency carrier comprises one of a 5G NR carrier or 4G LTE carrier.

16. The system of claim 12, wherein the donor access node and the relay nodes are configured to utilize a dual connectivity operating mode using at least the high-frequency carrier and at least one other carrier.

17. The system of claim 16, wherein the operations further comprise instructing the relay nodes to attach to the lower-frequency carrier as a primary carrier using the dual connectivity operating mode.

18. A processing node, the processing node being configured to perform operations comprising:

determining an intermodulation distortion level measured at a donor access;

instructing relay nodes to attach to a millimeter wave (mmW) carrier deployed by a donor access node responsive to the intermodulation distortion level at the donor access node being below a threshold; and instructing the relay nodes to detach from the mmW carrier responsive to the intermodulation distortion level measurement being above the threshold; and responsive to the intermodulation distortion level measurement being above a threshold, instructing the relay node to attach to a second lower-frequency carrier deployed by the donor access node.

19. The processing node of claim 18, wherein the operations further comprise setting the mmW carrier as a default carrier for relay nodes that are within a threshold distance from the donor access node.

20. The processing node of claim 19, wherein the operations further comprise instructing the relay nodes within the threshold distance from the donor access node to utilize the mmW carrier as a secondary carrier in a dual-connectivity operating mode.

* * * * *